United States Patent [19]

Woo et al.

[11] 4,435,547
[45] Mar. 6, 1984

[54] STABILIZED POLYPYRROLIDONE END CAPPED WITH ALKANOLAMINE AND PROCESS FOR PREPARING

[75] Inventors: Gar L. Woo, Tiburon; Phillip H. Parker, San Rafael, both of Calif.

[73] Assignee: Chevron Research Company, San Francisco, Calif.

[21] Appl. No.: 465,226

[22] Filed: Feb. 9, 1983

Related U.S. Application Data

[63] Continuation-in-part of Ser. No. 220,483, Dec. 29, 1980, abandoned, which is a continuation-in-part of Ser. No. 220,575, Dec. 29, 1980, Pat. No. 4,383,065.

[51] Int. Cl.$^3$ .............................................. C08G 69/48
[52] U.S. Cl. ................... 525/420; 525/419; 528/315; 528/326
[58] Field of Search ............... 525/420, 419; 528/315, 528/326

[56] References Cited

U.S. PATENT DOCUMENTS

| | | | |
|---|---|---|---|
| 3,009,893 | 11/1961 | Barnes et al. | 260/30.2 |
| 3,026,301 | 3/1962 | Ney | 525/420 |
| 3,042,659 | 7/1962 | Follett | 528/315 |
| 4,076,696 | 2/1978 | Neafsey | 528/326 |

OTHER PUBLICATIONS

International Union of Pure & Applied Chemistry, Nomenclature of Organic Chemistry, 1969, p. 252.

*Primary Examiner*—Harold D. Anderson
*Attorney, Agent, or Firm*—D. A. Newell; T. G. DeJonghe; L. S. Squires

[57] ABSTRACT

Poly-2-pyrrolidone polymer and compositions having improved thermal stability via the capping of at least a portion of the amino and/or carboxy end group of the polymer and processes for preparing such polymers and compositions. The processes are characterized by the reaction of the polymer with alkanolamines and/or alkyl polyamines. The products afford improved melt processability.

25 Claims, No Drawings

STABILIZED POLYPYRROLIDONE END CAPPED WITH ALKANOLAMINE AND PROCESS FOR PREPARING

CROSS REFERENCE TO RELATED APPLICATIONS

This application is a continuation-in-part of application Ser. Nos. 220,483, now abandoned, and 220,575 both filed Dec. 29, 1980, now U.S. Pat. No. 4,383,065. The disclosure of which applications are hereby incorporated by reference in their entirety.

BACKGROUND OF THE INVENTION

1. Field of the Invention

This invention relates to capped poly-2-pyrrolidone compositions having improved thermal stabilities and to methods of treating poly-2-pyrrolidone to prepare the capped poly-2 pyrrolidone compositions. In another aspect, this invention relates to methods of melt extruding, and especially melt spinning, such compositions.

2. The Prior Art

Poly-2-pyrrolidone is produced by the alkaline-catalyzed polymerization of poly-2-pyrrolidone in the presence of carbon dioxide (see U.S. Pat. No. 3,721,652). Polypyrrolidone so-produced can be melt-spun into filaments by extrusion from multihole spinnerets. In melt-spinning, the polymer composition is extruded in a molten condition at a melt temperature which is generally greater than about 270° C. This extrusion must be carried out with care because of the propensity of the polymer to thermally degrade, reverting back to monomer. As well as causing substantial product loss and increasing process cost, this can also cause bubbles and the formation of voids or pox marks in the extrudate or filaments. Moreover, in addition to monomer reversion, molecular weight degradation also occurs during melt spinning resulting in poly-2-pyrrolidone filaments having substantially lower molecular weights than the original polymer. If the molecular weight of the initial polymer is too low or if the molecular weight degradation is too severe, the molecular weight of the filaments will be inadequate to afford the filaments sufficient tensile strength and fibrillation properties. (Mere molecular weight degradation in itself is not a significant problem unless the molecular weight is in fact degraded below the tensile strength-fibrillation limits.)

A further problem is that higher molecular weight (e.g., about 120,000 and above) polymers, although thermally more stable, are also more viscous and more difficult to extrude.

If extrusion is attempted at appreciably lower temperatures to avoid thermal decomposition, the material is not properly melted and fibers of substantially lower tensile strength are produced. Consequently, in order to melt extrude polypyrrolidone efficiently, one may either seek to increase the thermal stability of the polymer, or to improve the extrudability of the polymeric composition.

The unusual propensity of poly-2-pyrrolidone to thermally degrade back to its monomer and the adverse effect on melt spinning or melt extrusion is recognized to be a serious problem and the prior art has made a number of attempts to mitigate this problem. For example, U.S. Pat. No. 3,052,654 attempts to reduce degradation occurring during melt extrusion by pre-heating the poly-2-pyrrolidone to remove degradation products, e.g., pyrrolidone.

U.S. Pat. No. 3,026,301 teaches that the reaction of 2-pyrrolidone and hexamethylenediamine during polymerization produces a poly-2-pyrrolidone polymer having improved thermal stability but, that if the hexamethylenediamine is mixed with the poly-2-pyrrolidone after polymerization, no improvement is obtained.

U.S. Pat. No. 4,076,696 discloses that the addition of a small amount of certain alkylamines and alkyleneamines, including hexamethylenediamine, to poly-2-pyrrolidone permits the material to be extruded at a lower temperature and may be functioning as a slip agent.

U.S. Pat. No. 3,017,393 teaches that the melt extrusion degradation problem may be alleviated by washing or treating the polymer with an aqueous organic carboxylic acid solution and similarly, U.S. Pat. No. 3,072,615 teaches using dilute aqueous fatty acid.

U.S. Pat. No. 4,071,486 teaches that the thermal stability of poly-2-pyrrolidone can be improved by the addition of certain epoxides.

U.S. Pat. No. 3,009,893 teaches that the problem may be reduced by the incorporation of relatively large amounts of certain substances which apparently function as melting point depressants permitting nylon-4 to be extruded at lower temperatures.

U.S. Pat. No. 3,549,580 discloses a process for preparing spinnable solutions of poly-beta-amides by the direct polymerization of beta-lactams (e.g., azetinone) in a neutral or weakly basic solvent, containing 0.9 to 50% wt lithium halides or lithium pseudo halides, in the presence of catalysts and optional activators. Dimethyl formamide is disclosed as a preferred solvent for economic reasons.

Japanese Patent No. 43-27434 (1968) discloses a process for improving the thermal stability of polypyrrolidone which comprises treating polypyrrolidone with an alcohol in the presence of a strong inorganic acid or organic sulfonic acid and Japanese Patent No. 44-23509 (1969) discloses a two-step process wherein the polymer is first treated with alcohol, in the presence of a strong acid, and then treated with a monoisocyanate.

Japanese Patent No. 43-23637 (1968) discloses a process for improving the thermal stability of polypyrrolidone which comprises treating polypyrrolidone with an aqueous boric acid solution. Similarly, Japanese Patent No. 43-130059 (1968) discloses a two-step process wherein the product of the boric acid treatment is treated with an organic isocyanate.

Also, while not concerned with thermal stability, U.S. Pat. No. 3,042,659 discloses a process for polymerizing 2-pyrrolidone which comprises polymerizing 2-pyrrolidone in a mixture containing a catalytic amount of an alkaline polymerization catalyst, a few percent of an N-monocarbonyl-2-pyrrolidone, polymerization activator and various organic acid amides, including dimethyl formamide. This patent teaches that the N-monocarbonyl pyrrolidone when used in conjunction with certain organic amides, which are not themselves activators, are highly effective activators for the polymerization of 2-pyrrolidone and that the polymer product has a high molecular weight. The patent further teaches that the organic acid amides are not themselves activators but augment the activation activity of the N-monocarbonyl-2 pyrrolidone.

SUMMARY OF THE INVENTION

Broadly, the present invention provides a capped poly-2-pyrrolidone composition having greatly improved thermal stability and processes for preparing such compositions. Even more significantly, the capped polymers of the present invention have sufficient thermal stability even to permit melt spinning capped polymers having weight average molecular weights in the range of about from 35,000 to 100,000 as well as higher molecular weight molecules. This is important because the 35,000 to 100,000 are easier to extrude and can be extruded at lower pressures and with less shear.

In one embodiment the invention provides a capped poly-2-pyrrolidone composition in which at least a major portion of the carboxyl end groups have been capped with an amino alkylene amine group or an aminoalkanol group.

In another embodiment the invention comprises a process for preparing such capped poly-2-pyrrolidone compositions by direct capping, without substantial polymer cleavage, which comprises contacting poly-2-pyrrolidone polymerizate with certain alkanolamines under reactive conditions. Such alkanolamines have at least two carbon atoms separating the hydroxy and amine end groups and preferably have 2 through 12 carbon atoms.

In still another embodiment the invention comprises a process for cleaving and capping poly-2-pyrrolidone thereby yielding a capped polymer having a lower weight average molecular weight than the original polymer, which comprises contacting poly-2-pyrrolidone with certain alkanolamines, or alkylenepolyamines, or mixtures thereof. Such alkanolamines and alkylenepolyamines have at least two carbon atoms separating the terminal functional groups (i.e. hydroxyamine and amine-amine respectively), under reactive conditions at elevated temperatures of at least about 50° C.

In another embodiment, the invention comprises a process which comprises melt extruding the compositions of the invention at extrusion melt temperatures in the range of about from 260° to 280° C.

The invention will be described in greater detail hereinbelow.

FURTHER DESCRIPTION OF THE INVENTION AND PREFERRED EMBODIMENTS

As above-noted, the compositions of the invention are prepared by reacting poly-2-pyrrolidone polymerizate with certain alkanolamines or poly-2-pyrrolidone with an alkanolamine or alkylenepolyamine [e.g., $NH_2(CH_2)_nNH_2$] for a sufficient period of time to effect the desired capping. Poly-2-pyrrolidone is generally considered to initially have the general formula

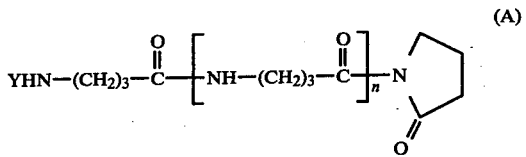

wherein n refers to average values and is typically a whole integer of about from 200 to 5000 and Y is hydrogen or formyl.

The general form of poly-2-pyrrolidone illustrated by formula A will be referred to herein as "polymerizate". The pyrrolidonyl end groups are very labile and open under very mild conditions, such as upon contact with water at room temperature to the polymer having the formula

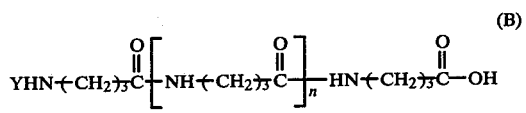

wherein n and Y are as defined in formula (A). Hence the most commonly encountered form of poly-2-pyrrolidone is represented by formula B and is and will be herein referred to as poly-2-pyrrolidone or polypyrrolidone or nylon-4. Also in both formulas A and B the lefthand terminated side is referred to as the amine terminated end and the righthand terminal side is referred to as the carboxyl terminated end.

The end capping, with which the present invention is concerned with, is capping the pyrrodinoyl (i.e. carboxyl) end groups of formula A and the carboxyl end groups of formula B. The degree of capping can be approximated by determining the reduction in the amount titratable carboxyl groups as compared with the original polymer. In the present invention this reduction is on the order of at least about 50 percent and preferably 80 percent and most preferably substantially all of the carboxyl end groups are capped. In the embodiment of the invention wherein the original polymer is cleaved and capped to produce a capped polymer composition of lower weight average molecular weight than the original polymer, it should be appreciated the additional end groups are created by cleaving the polymer.

The capped polymer molecules of the present invention have a weight average molecular weight of about from 35,000 to 200,000, preferably about from 40,000 to 150,000 and more preferably about from 50,000 to 100,000 and generally have a dispersion ratio (i.e. weight average molecular weight divided by number average molecular weight) of about 1.5–3. Since the lower weight average molecular weight polymers are easier to extrude, a weight average molecular weight range of about from 35,000 to 100,000 can be conveniently used. The present capped polymers can be generally represented by the following formula:

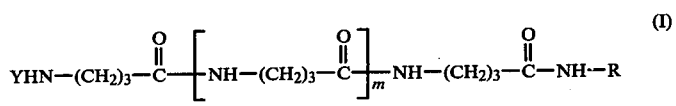

wherein m refers to average values and is a whole integer, typically at least about 200 and preferably about from 250 to 900; Y is hydrogen or formyl (i.e., —CHO);

R is a radical having 2 through 12 carbon atoms having the formula —$R^1R^2Z$ wherein Z is hydroxy or amino and $R^1$ and $R^2$ are independently selected from the group of lower alkyl and substituted lower alkyl having 1 through 3 substituents independently selected from the group of amino and hydroxy and wherein the total of the sum of the substituents in $R^1$ plus $R^2$ is 0, 1, 2 or 3 and wherein each carbon atom in said radical has a maximum of one hydroxy or one amino substituent including Z and preferably the $R^2$ carbon atom joining Z is a methylene carbon atom.

For a given molecular weight, the polymers of formula I wherein R— is —$R^1R^2$OH and/or Y is formyl, afford superior thermal stability (i.e., resistance to thermal molecular degradation and monomer generation) especially where both R— is —$R^1R^2$OH and Y is formyl. The polymers of the invention wherein R— is —$CH_2CH_2OH$ have especially good thermal stability and melt processability. In the case where R— is —$R^1R^2NH_2$ the preferred polymers are those wherein R— is —$CH_2CH_2NH_2$ or —$(CH_2)_6NH_2$. Also in each case the compounds of the invention wherein the carbon atom in $R^2$ attached to Z is methylene (i.e. R is —$R^3CH_2Z$, wherein $R^3$ is as defined for $R^1$ but has 1 through 11 carbon atoms) and preferably also where the carbon of $R^1$ attached to the amide nitrogen of the polymer (i.e. R is —$CH_2(R^4)_{m'}CH_2Z$ wherein $R^4$ is as defined for $R^1$ but has 1 through 10 carbon atoms and m' is 0 or 1) also have better stabilities.

In the past very high molecular weight polypyrrolidone having weight average molecular weights of 300,000 or greater has been preferred for melt spinning to compensate for molecular weight degradation occurring during melt pelleting and melt spinning and also because of its generally superior thermal stability. We have now discovered that the capped polymers of the present invention having weight average molecular weight in the range of about from 35,000 to 200,000, preferably about from 40,000 to 150,000 and especially from about 50,000 to 100,000 have sufficient thermal stabilities, especially when used in combination with certain additives as described in our copending application Ser. No. 220,575, filed Dec. 29, 1980, to facilitate the production of good quality fibers by melt spinning. Further, the capped polymers of the present invention are easier to melt spin than higher molecular weight polymers because of their reduced viscosities, and afford fibers having adequate weight average molecular weights and good tensile strength and general fiber properties.

The composition of formula I where R— is —$R^1R^2NH_2$ can be prepared by the cleaving-capping process of the present invention. The composition of the invention of formula I wherein R— is —$R^1R^2$OH can be prepared by either the direct polymerizate capping or the cleaving-capping process of the present invention.

In both processes whether Y is hydrogen or formyl is generally a direct function of the starting material used. If the starting material has an unsubstituted terminal amine group (e.g. formula A or B wherein Y is H) such as is prepared by the usual polymerization process, Y will be hydrogen in the resulting product of formula I. Correspondingly, if, instead of an unsubstituted amino terminating group the starting material has a formamido terminating group, Y will be formyl in resulting product of the invention. The R group in formula I is also a direct function of the capping agent used. For example when ethanolamine (i.e. $NH_2$—$CH_2CH_2OH$) is used as the capping agent, R— will be —$CH_2CH_2OH$, and where hexamethylenediamine (i.e. $NH_2$—$(CH_2)_6NH_2$) is used R— will be —$(CH_2)_6NH_2$.

Where direct capping of end groups is used the molecular weight of the product is close to (but, generally slightly less than) the weight average molecular weight of the starting material polymer. In the cleaving capping process a high proportion of the starting polymer is cleaved and it is mainly the end groups created by cleaving, that are capped in the present invention because of their greater reactivity. Whether one chooses to use the direct capping process or the cleaving and capping process, will generally depend upon the molecular weight of the polymer and the molecular weight desired in the capped polymer and whether polymerizate is available.

The direct capping process of the present invention can be effected by contacting polymerizate with an alkanolamine temperature in the range of about from 20° to 100° C., preferably about from 25° to 80° C., for about from 0.5 to 50 hours preferably from about 1 to 30 hours. The alkanolamines used in the present process are the same as used in the cleaving-capping mode and will be subsequently described with respect to that process.

Interestingly, we have found that alkylene polyamines are not as effective in this process but can be used in the cleaving-capping process which is conducted at higher temperatures.

The combined cleaving and capping process of the invention can be effected by contacting poly-2-pyrrolidone (formula B) with an alkylenepolyamine and/or an alkanolamine under reactive conditions. This process is typically conducted at temperatures in the range of about 50° to 250° C., for about from 0.1 to 200 hours, preferably about from 0.5 to 20 hours. Where an alkanolamine is used, best results, in terms of product thermal stability, are typically obtained using temperatures in the range of about from 125° to 175° C. for about from 1 to 10 hours. Where an alkylenepolyamine is used, best results, in terms of product thermal stability, are typically obtained using temperatures in the range of about from 150° to 200° C. for about from 1 to 10 hours.

If temperatures below those prescribed for the cleaving-capping hereinabove are used, the reaction rate declines such as to be uneconomical and at room temperature (i.e. 20° to 25° C.) cannot be discerned within a reasonable time period. At higher temperatures, the reaction is difficult to control because the polymer degrades too rapidly resulting in a polymer having poor thermal stabilities.

In theory, in both the direct capping process and the cleaving and capping process, one mole of capping agent is used per mole of polymer including the polymers generated by cleaving, however, in practice a substantial excess of the capping agent is generally used to ensure adequate contact with the polymer. Thus, typically about from 2 to 10 grams, preferably about from 2 to 4 grams of capping agent is used per gram of polymer. Alternatively, suitable inert organic diluents or inert organic solvents for the capping agent can also be advantageously used to reduce the amount of alkanolamine and/or alkylenediamine required to maximize polymer contact and facilitate handling.

Also, in both processes it is preferred that the polymer is contacted as a finely divided powder in order to maximize contact of the polymer with the normally liquid, or dissolved at the reaction temperature, alkanolamine or alkylenepolyamine.

Optimum temperatures, reaction times, etc. can be determined by routine experimentation. Reaction rates are generally dependent upon temperature and thus lower reaction times can be used with higher reaction temperatures and vice versa.

Suitable alkanolamine capping agents which can be used in both the direct capping process and the cleaving and capping process of the present invention include, for example, alkanolamines having from 2 through 12 carbon atoms, preferably from 2 through 6 carbon atoms, and at least one hydroxy substituent and one amino substituent each substituted at different carbon atoms. The alkanolamine can also be optionally substituted with up to, and including a total of five hydroxy and/or amino substituents substituted at different carbon atoms. It is important that the carbon atom contains only a single substituent because compounds having carbon atoms having two amino or two hydroxy or an amino and a hydroxy substituent are unstable and would be expected to degrade either during the initial process and/or in polymer upon melt spinning. Suitable alkanolamines can be represented by the formula $NH_2R^1R^2OH$ wherein $R^1$ and $R^2$ are as defined hereinabove. Preferably, both the carbon atom of $R^1$ attached to the $NH_2$ group and the carbon atoms of $R^2$ attached to the OH are each methylene carbon atoms (i.e. $NH_2CH_2(R^4)_{m'}CH_2OH$ wherein $R^4$ is as defined for $R^1$ but has 1 to 10 carbon atoms and $m'$ is 0 or 1) as such compounds have superior stability. Suitable alkanolamines species which can be used include, for example, ethanolamine, 3-aminopropanol, 10-aminodecanol; 4-amino-2-ethyl-butanol; 2-hydroxy-4-aminobutanol, 2,4-diaminobutanol, 2-hydroxymethyl-5-aminopentanol, and the like.

Suitable alkylenepolyamines which can be used for the cleaving and capping process include, for example, alkylenepolyamines having 2 through 12 carbon atoms preferably 2 through 6 carbon atoms, substituted with 2 through 5 amino substituents each at different carbon atoms and optionally 1 through 3 hydroxy substituents each at different carbon atoms up to and including a total of 5 such substituents. Suitable alkylenepolyamines having the formula $NH_2R^1R^2NH_2$ wherein $R^1$ and $R^2$ are as defined hereinabove. Again, it is preferred that the carbon atom in $R^1$ and the carbon atom in $R^2$ attached to the $NH_2$ groups are methylene carbon atoms (i.e. $NH_2CH_2(R^4)_{m'}CH_2NH_2$ wherein $R^4$ and $m'$ are as defined hereinabove) as such compounds have superior stability. Suitable alkylenepolyamine species include, for example, ethylenediamine, hexamethylenediamine, dodecylene diamine; 1,5-diamino-2-methylpentane; 1,2,4-triaminobutane; 1,5-diamino-3-hydroxyhexane; 1,2,6-triamino-4-3-hydroxyethylhexane, and the like. In terms of capped polymer product thermal stability for a given molecular weight, best results are generally obtained using alkanolamines and especially ethanolamine. Where an alkylenepolyamine is used, it is preferred to use an alkylenediamine such as ethylenediamine and hexamethylenediamine.

Where the same alkanolamine capping agent is used, the polymers prepared by both the direct capping process and the cleaving and capping process are generally the same with the exception of the average length of the polymer chains. In the direct capping process usually very little change in molecular weight occurs whereas in the cleaving and capping process substantial cleaving occurs and the weight average molecular weight of the polymer is usually reduced several fold as compared with the original polymer. Accordingly, it is preferable to use a higher molecular weight polymer where practicing the cleaving-capping embodiment than used with the direct capping process.

The normally solid poly-2-pyrrolidone used in the present processes can be prepared via any suitable polymerization procedure which affords a normally solid polymer having a weight average molecular weight above about 40,000, preferably above 50,000, up to about 1,000,000. General polymerization procedures for preparing such polymers are, for example, described in U.S. Pat. Nos. 3,721,652; 4,098,774, etc., which procedures are hereby incorporated by reference.

In the direct capping process it is preferred to use a polymer starting material having a weight average molecular weight in the range of about from 40,000 to 200,000, since relatively little degradation occurs. Whereas in the cleaving-capping process it is preferred to use polymer starting materials having a weight average molecular weight of about from 200,000 to 1,000,000 to account for polymer cleavage. Also in the direct capping process polymerizate (formula A) product produced prior to water washing can be used without separation from the reaction product or preferably is first washed with methanol. Whereas, the water washed polymer product (formula B) is used in the cleaving-capping process.

The formamido terminated polymers of formulas A and B wherein Y is formyl can be conveniently prepared by polymerizing pyrrolidone in the usual manner but, using dimethylformamide as a polymerization initiator.

One suitable polymerization procedure which can be used comprises adding an alkali metal hydroxide to excess 2-pyrrolidone, in an amount of about from 5 to 15 mol percent, based on the pyrrolidone. The alkali metal hydroxide reacts with 2-pyrrolidone to form a solution of alkali metal pyrrolidonate and water in 2-pyrrolidone. This solution is dehydrated until it contains less than about 0.1 to 0.2 weight percent water and then carbon dioxide is added in an amount corresponding to about from 10 to 50 mol percent of the alkali metal 2-pyrrolidonate present in solution, e.g., 10 to 50 mol percent based on cationic species such as sodium or potassium. By adding dimethylformamide to the carbonated mixture as an initiator, the formylamino terminated polymer (formulas A and B wherein Y is formyl) will be prepared. Typically, where dimethylformamide is used, about from 1 to 10% based on total pyrrolidone is used.

The polymerization mixture is then maintained, preferably with stirring, at temperatures in the range of about from 40° to 70° C. until the desired polymerization has been effected. At this point, the polymer is in the form represented by formula (A) and referred to as polymerizate and can be used for the direct capping process of the present invention. The polymerizate can be used directly or can be removed from the reaction product mixture by filtration and if desired, can be washed with an alkanol (e.g. methanol). Upon water washing, etc. the polymerizate converts to the polymer form represented by formula (B) and can be used for the cleaving and capping process of the invention.

Suitable detailed polymerization procedures are, for example, described in Preparations A-C set forth hereinbelow on pages 16-19.

The capping processes of the present invention can be conveniently applied by the polymer manufacturer as a last step to the polymerization process or can be applied as an independent and distinct operation. Where the process is applied as part of the polymerization operation best results are obtained if care is taken to remove substantially all of the base catalyst and unreacted pyrrolidone (for example, by alcohol washing where polymerizate is desired), prior to applying the present processes.

In our copending U.S. application Ser. No. 220,575, filed on Dec. 29, 1980, which disclosure is hereby incorporated by reference in its entirety, we further disclose that by admixing small amounts of certain organic epoxides and/or isocyanates and optionally certain polyols with our capped polymer, that the thermal stability and melt spinnability of the capped polymer composition can be even further improved.

The additives can be admixed with the capped poly-2 pyrrolidone by any suitable mixing procedure. For example, the materials can be conveniently mixed by coating pellets of capped poly-2-pyrrolidone with the additives before melt extrusion (e.g. melt spinning) or by pelletizing or kibbling the capped poly-2-pyrrolidone powder with the desired amount of the additive or additives. Where desirable, the additive can be dissolved in a solvent before being mixed with the poly-2 pyrrolidone and the solvent then removed (e.g., evaporated at low temperatures) prior to melt extrusion.

The improvement in thermal stability exhibited by the capped poly-2-pyrrolidone of the present invention, facilitates the melt extrusion and particularly melt spinning of the compositions of the invention at temperatures in the range 260° to 285° C. and preferably less than about 280° C., and most preferably below 275° C. The filaments obtained in accordance with the present invention generally possess superior filament textile properties (e.g., greater tenacity and reduced fibrillation).

The composition of the invention, although primarily designed to be used as filaments, can also be shaped into other shaped articles, such as, for example, films, sheets, containers, moldings, etc.

DEFINITIONS

As used herein, the following terms have the following meanings unless expressly stated to the contrary.

The term "alkyl" refers to both straight-chain and branched-chain alkyl groups and includes alkylene. Typical alkyl groups include for example, methyl, methylene (—CH$_2$—), ethyl, isopropyl, n-butyl, t-butyl, hexyl, decyl, tetradecyl, 4-methyl hexadecyl, eicosyl, and the like. The term "lower alkyl" refers to alkyl groups having from 1 through 6 carbon atoms.

The term "alkylene" when used as a radical refers to an aliphatic diradical, for example, —(CH$_2$)$_{n'}$— wherein n' is a whole number and branched alkylenes e.g.

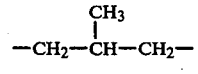

The term "arylene" refers to an aromatic group having two unsatisfied valances, for example, phenylene, 2-methyl phenylene and the like.

The term "alkoxy" refers to the group XO— wherein X is alkyl as defined hereinabove.

The term "cycloalkyl" refers to monocycloalkyl, dicycloalkyl and bicycloalkyl groups having 3 through 12 carbon atoms. Typical cycloalkyl groups include, for example, cyclopropyl, cyclopentyl, cyclohexyl, cyclooctyl, bicyclo[4.4.0]decane, 1,1'-bicyclopropane and the like.

The term "ethanolamine" or "monoethanolamine" refers to the compound having the formula HOCH$_2$CH$_2$NH$_2$.

The term "shaped articles" is a generic term referring broadly to one or more useful products which are commonly referred to as being made of plastic or in that context as synthetic (e.g., synthetic fibers). The term thus includes, for example, filaments, films, sheets, containers, moldings, equipment cases and parts, etc.

The term "pyrrolidone" or "monomer" refers to 2-pyrrolidone.

The terms "molecular weight" and "Mw", when used with reference to a polymer, refers to weight average molecular weight.

The "weight average molecular weight" is determined by solution viscosity using a 5% or 10% (e.g. 0.5 g/10 ml or 1/10 ml 88% wt. HCO$_2$H) solution of the dried extracted polymer sample in 88% aqueous formic acid, and applying a Gardner viscosity molecular weight type relationship developed from specific viscosities of 0.1 g of known weight average molecular weight poly-2-pyrrolidone polymers in 100 ml of m-cresol at 25° C.

A further understanding of the invention can be had from the following non-limiting examples, wherein weight average molecular weights were determined by the immediately above-described procedure.

Preparation A

This preparation illustrates a procedure for preparing high molecular weight poly-2-pyrrolidone useful for the cleaving-capping process of the invention.

Two thousand pounds/hr of freshly distilled 2-pyrrolidone is charged through a line mixer simultaneously with 330 pounds/hr of a 40% aqueous potassium hydroxide solution. The alkaline mixture is then transferred at 2330 pounds/hr to a vessel maintained at 40° C. After an average residence time of 15 minutes, the heat-treated alkaline mixture is passed into a distillation zone comprising a wiped-film evaporator maintained at 80° C. and 3 mm pressure, and wherein 240 pounds/hr of water is vaporized and removed from the alkaline mixture. The dehydrated alkaline mixture at 80° C. is next passed at 2090 pounds/hr into a carbonation vessel wherein it reacts with 31 pounds/hr of carbon dioxide. The resultant carbonated alkaline mixture is maintained at 80° C. while passing from the carbonation vessel to the polymerization reactor. The polymerization reactor is a stirred, cooled, conical vessel in which about 16,000 pounds of polymerizate is continuously mixed at 50° C. The polymerization vessel contains a heavy paste of particulate polymerizate and liquid pyrrolidone which is removed by means of an auger after an average polymerization time of 6 to 8 hours. The polymerizate mixture is washed with methanol and, subjected to molecular weight considerations, could be used in the direct capping process of the present invention or the polymerizate mixture is charged directly with essentially no cooling to a neutralization vessel at 2121 pounds/hr. The neutralizer is concurrently provided with 120 pounds/hr of concentrated 98% aqueous sulfuric acid and 1000 pounds/hr of a water-pyrrolidone-$K_2SO_4$ solution from the countercurrent washer. The resulting slurry is stirred at a temperature of 50° C. for an average of 10 minutes. Overflow from the neutralizer next passes at 3241 pounds/hr into a water washer wherein it is contacted countercurrently by 5000 pounds/hr of water at 50° C. The used wash water, containing 1000 pounds/hr of pyrrolidone, is sent to monomer recovery facilities. The washed polymer, 1500 pounds/hr, is dried by heating at 120° C. under atmospheric pressure in a fluidized dryer for 30 minutes. This preparation generally produces about 1000 pounds/hr of dry, polypyrrolidone powder having a weight average molecular weight of about 300,000. Because of its relatively high molecular weight, it is generally used in the cleaving-capping process.

PREPARATION B

This preparation illustrates a polymerization process using dimethylformamide as a polymerization initiator.

An essentially anhydrous 2-pyrrolidone mixture containing 10 mol percent (based on total pyrrolidone) is prepared by mixing 2-pyrrolidone with the requisite amount of aqueous 35 to 45 weight % potassium hydroxide at room temperature. Reaction is almost spontaneous. The mixture is then heated at 30° to 50° C. to cleave 2-pyrrolidone dimer and then stripped under vacuum to reduce the water content of the mixture to below 500 ppm by weight.

Two hundred and thirty-three (233) pounds of this mixture are placed in a reactor. Carbon dioxide is then bubbled through the mixture at room temperature until sufficient carbon dioxide has been taken up to provide a potassium carboxy pyrrolidonate concentration of 2.5 mol percent (based on total pyrrolidone). Sufficient dimethylformamide is then slowly admixed with the mixture to provide a dimethylformamide concentration of 8.5 weight % (based on total pyrrolidone). The mixture is then polymerized for four hours at temperatures of between 26° to 46° C. (with an average temperature of about 33° to 36° C.

The resulting polymerizate reaction produced mixture can be used directly for the direct capping process or preferably the polymerizate is first washed with methanol to remove catalyst and unreacted pyrrolidone. Alternatively the polymerizate mixture can be washed with acidified water to neutralize any traces of catalyst (potassium pyrrolidonate) and then demineralized water. The resulting washed polymer can be used in the cleaving-capping process of the invention. Polymers produced by this polymerization procedure generally have a weight average molecular weight of about 67,000.

PREPARATION C

In this preparation the same procedure was followed as described in Preparation B but in this instance 0.025% (based on pyrrolidone) of a filler material (i.e. titanium oxide) was added to the pyrrolidone catalyst mixture prior to carbonation and only 1.75 weight % (based on total pyrrolidone) dimethylformamide was used. The reaction mixture is polymerized for 6.5 hours at temperatures between 27° to 51° C. with an average polymerization temperature of 44° C. The product is recovered in the same manner as described in Preparation B.

Polymers produced by this procedure generally have a weight average molecular weight of about 109,000. By increasing the polymerization temperature and polymerization time, lower average molecular weight polymer products can be prepared.

EXAMPLE 1

This example illustrates the cleaving-capping method of the invention for preparing the capped polymers of the present invention, wherein Y is H.

In a 500 ml flask equipped with a stirrer, thermometer, water condenser, and nitrogen blanketing was placed 300 gm of monoethanolamine (MEA) and 100 gm dry poly-2-pyrrolidone (formula B, Y is H) powder having a weight average molecular weight of about 300,000. The mixture was heated to 125° C. with stirring and was stirred and maintained at 125° to 130° C. for 15 hours. The mixture was then cooled to 32° C. and then combined with 163 gm of ice. The supernatant liquid was decanted and the product was washed several times with excess water and filtered after each washing. The product was dried at 120° C. under nitrogen vacuum. The resulting capped polypyrrolidone polymer product had a weight average molecular weight of 58,000.

Similarly, by following the same procedure but using the reaction temperatures and times and capping agents indicated in Table I, hereinbelow, the capped polymers indicated therein were prepared.

TABLE I

| Capping Agent Product | Reaction Temp. °C. | Reaction Time-Hours | Polymer Wt. Aver. Mw × 10$^{-3}$ |
|---|---|---|---|
| Ethylenediamine | 114 | 31 | 58 |
| (I, Y is H, R is | 114 | 36 | 60 |
| —$(CH_2)_2NH_2$) | 114 | 24 | 73 |
|  | 114 | 24 | 80 |
|  | 114 | 24 | 85 |
| Monoethanolamine | 150 | 4 | 52 |
| (I, Y is H, R is | 170 | 2½ | 53 |
| —$(CH_2)_2OH$) | 130 | 16 | 55 |
|  | 150 | — | 70 |
|  | 150 | 1 | 76 |
|  | 150 | 2¾ | 83 |
| Hexamethylenediamine | 178 | 4 | 57 |
| (I, Y is H, R is |  |  | 60 |
| —$(CH_2)_6NH_2$) |  |  |  |

EXAMPLE 2

This example illustrates the preparation of the capped polymers of the invention wherein Y is formyl (formula I) by the direct capping process of the invention.

In this example a raw polymerizate reaction product mixture, prepared via the general procedure described in Preparation B hereinabove using dimethylformamide as an initiator, containing polymerizate polymer having a weight average molecular weight of about 65,000 to 70,000 was used directly without removal of catalyst and excess pyrrolidone. Fifty grams of this reaction product mixture was immersed in 100 ml of monoethanolamine at room temperature (i.e. about 20° C.) at atmospheric pressure. The temperature of the mixture was increased to 65° C., and the mixture stirred at this temperature for 10 hours. The mixture was then allowed to cool to room temperature and the resulting capped polymer product then removed and washed with 500 ml portions of water until neutral (pH 7) and then dried. The weight average molecular weight of the polymer product was 59,000 (formula I, Y is formyl, R is —CH$_2$CH$_2$OH).

Similarly, by following the same procedure but using the reaction temperatures and times indicated in the following Table II, the capped polymers of the invention listed therein were prepared.

TABLE II

| Capping Agent | Reaction Temp. °C. | Reaction Time-Hours | Polymer Wt. Aver. Mw × 10$^{-3}$ |
|---|---|---|---|
| Monoethanolamine | 65 | 10 | 59 |
| Monoethanolamine*[1] | 65 (reflux) | 10 | 54 |
| Monoethanolamine | 65 | 18 | 60 |
| Monoethanolamine | 50 | 18 | 65 |
| Monoethanolamine | 50 | 30 | 61 |
| Monoethanolamine*[2] | 50 | 30 | 64 |

*[1]A solution of 20 ml of monoethanolamine in 80 ml of methanol was used in place of the 100 ml of monoethanolamine.
*[2]Polymerizate was washed twice with methanol before being treated with monoethanolamine.

(i.e. 2-pyrrolidone) generation is determined by substracting the amount of monomer generated by the capped polymer from that generated by the control and dividing this result by the amount generated by the control and multiplying this result by 100 to arrive at percent. The percent reduction in molecular weight is determined by subtracting the weight average molecular weight of the sample material after the thermal test from the original weight average molecular weight of that material before the thermal test and dividing this by said original molecular weight and multipyling the result by 100.

As can be seen from Table III the capped polymers of the present invention exhibited superior thermal stability, affording a reduction in 2-pyrrolidone generation over the control on the order of 41 to 55% and further exhibited improved molecular weight retention. The monoethanolamine capped polymers of the invention exhibit the greatest improvement in thermal stability reducing the amount of 2-pyrrolidone generated by 49 to 55%.

TABLE III

| Capping Agent | Initial Mw*[1] × 10$^{-3}$ | Mettler FP-2 Hot Stage, 3 Min. at 269° C. | | MW*[1] × 10$^{-3}$ | MW*[1] % loss |
|---|---|---|---|---|---|
| | | 2-Pyrrolidone Generation | | | |
| | | Wt % Formed | Reduction % | | |
| Uncapped Control | 65 | 14.5 | — | 29 | 55 |
| Ethylenediamine | 58 | 8.5 | 41 | 34 | 41 |
| " | 60 | 7.2 | 50 | 35 | 42 |
| " | 73 | 8.0 | 45 | 36 | 51 |
| " | 80 | 7.9 | 46 | 40 | 50 |
| " | 85 | 6.9 | 52 | 39 | 54 |
| Monoethanolamine | 52 | 7.4 | 49 | 31 | 40 |
| " | 53 | 6.5 | 55 | 30 | 43 |
| " | 55 | 6.5 | 55 | 33 | 40 |
| " | 70 | 6.9 | 52 | 36 | 49 |
| " | 76 | 6.7 | 54 | 35 | 41 |
| " | 83 | 7.1 | 51 | 36 | 57 |
| Hexamethylenediamine | 57 | 8.0 | 45 | 35 | 39 |
| " | 60 | 7.5 | 48 | 35 | 42 |

*[1]Mw = weight average molecular weight

EXAMPLE 3

In this example, Mettler FP-2 hot stage grid thermal stability tests were designed and conducted to approximate the thermal conditions encountered in melt spinning polypyrrolidone. The capped polymers of the present invention exhibited substantially superior activity in these tests as compared with uncapped polymers of comparable weight average molecular weight.

Representative samples of the capped polymers of Example 1 and control samples of an uncapped poly-2-pyrrolidone having a similar weight average molecular weight and prepared by the same general procedure as set forth in Preparation A hereinabove were respectively tested on a Mettler FP-2 hot stage grid at 269° C. for 3 minutes. The samples were then extracted with water and weighed. Since 2-pyrrolidone is soluble in water, whereas poly-2-pyrrolidone is insoluble, the difference in weight between the initial sample and the extracted sample, represents the amount of 2-pyrrolidone generated by thermal degradation of the polypyrrolidone. The weight average molecular weight of the extracted sample was then determined by the solution viscosity method previously described. Two to four test samples were run for each composition and the reported results determined by averaging the values obtained for each test sample for that composition.

The averaged values are reported in the following Table III. The percent reduction in thermal monomer

EXAMPLE 3a

In this example Mettler FP-2 hot stage grid thermal stability tests were conducted to show that the simple physical mixing of an alkanolamine to polypyrrolidone, for example, a melting point depressant as described in U.S. Pat. No. 3,009,893 followed by melt extrusion, would not result in the present composition. As before noted while not actually melt extrusion the present Mettler FP-2 hot stage grid thermal stability were designed to approximate the thermal conditions encountered in melt extrusion and are used as a screen to determine the suitability (thermal stability) of materials for melt extrusion. These tests were conducted in the same manner as described in Example 3 hereinabove, with the exception that weight average molecular weight was not determined after the hot stage tests because the appropriate equipment was not available at the time these tests were conducted.

In this example a physical mixture containing 30 wt percent monoethanolamine and 70 wt. % polypyrrolidone, was prepared by the simple admixture of the appropriate amount of monoethanolamine with polypyrrolidone at room temperature. The resulting composition was allowed to stand for about two hours at room temperature and then tested on an FP-2 Mettler hot stage grid for three minutes at 269° C. and then tested for monomer loss in the same manner as described in Example 3 hereinabove. The polypyrrolidone used in this test had a weight average molecular weight of 60,000 and was prepared by the same procedure as the polypyrrolidone used in Example 3 above. A control sample of the polypyrrolidone was also tested on the hot stage for comparison purposes. The results of this test are shown in Table IIIa hereinbelow.

TABLE IIIa

| MEA Wt. % | Mettler FP-2 Hot Stage Test Three Minutes at 269° C. | | |
|---|---|---|---|
| | Initial MW | 2-Pyrrolidone Generation | |
| | | Wt. % formed | Reduction |
| 0 | 60,000 | 12.7 | — |
| 30 | 60,000 | 12.8 | 0 |

MEA: monoethanolamine
MW: weight average molecular weight

As can be seen from the above Table the physical incorporation of monoethanolamine failed to produce any improvement in thermal stability over the untreated material.

EXAMPLE 4

This example illustrates the superior thermal stability afforded by the capped polymers of the present invention as compared with uncapped polymers of comparable weight average molecular weight.

Representative samples of the capped polymers of Example 2 and a control sample of 65,000 to 70,000 weight average poly-2-pyrrolidone (prepared by the general procedure described in Preparation B using dimethylformamide as an initiator) were respectively tested on a Mettler FP-2 hot stage at 269° C. for 3 minutes. The samples were then extracted with water and weighed. Since the pyrrolidone is soluble in water, whereas poly-2-pyrrolidone is insoluble, the difference in weight between the initial sample and the extracted sample represents the amount of pyrrolidone generated by thermal degradation of the poly-2-pyrrolidone. The weight average molecular weight of the extracted sample was then determined by the solution viscosity method described above. Two to four tests were run for each composition and the results averaged. The percent reduction in monomer generation vis-a-vis the control and the percent loss in molecular weight vis-a-vis the original weight of the material were determined in the same manner as described in Example 3 hereinabove. Again, two to four samples were tested for each material and the results averaged. The averaged results are reported in Table IV hereinbelow.

As can be seen from Table IV the capped polymers as the present invention again exhibits superior thermal stability reducing the amount of 2-pyrrolidone generated as compared with the control by 14 to 32%. The capped polymers also generally exhibited superior weight average molecular weight retention. Although the improvement is not as dramatic as in Example 3, it should be appreciated that in this instance the terminal amino groups of the control polymer have been capped with a formyl group and thus have superior thermal stability to poly-2-pyrrolidone produced by the usual polymerization process which does not use dimethylformamide as an initiator. Thus, the area for maximum improvement is not as great, nonetheless, the capped polymers of the present invention still afforded a meaningful improvement in thermal stability over the control.

TABLE IV

| Capping Agent | Initial Mw × 10⁻³ | Mettler FP-2 Hot Stage, 3 Min. at 269° C. | | MW*³ × 10⁻³ | MW*³ % loss |
|---|---|---|---|---|---|
| | | 2-Pyrrolidone Generation | | | |
| | | Wt % Formed | Reduction⁴ | | |
| Control | 57–78 | 9–10.5 | — | 29–33 | 49–58 |
| Monoethanolamine | 59 | 7.5 | 25 | 31 | 48 |
| Monoethanolamine*¹ | 54 | 8.0 | 20 | 30 | 45 |
| Monoethanolamine | 60 | 8.3 | 17 | 31 | 48 |
| Monoethanolamine | 65 | 8.6 | 14 | 32 | 51 |
| Monoethanolamine | 61 | 8.1 | 19 | 31 | 50 |
| Monoethanolamine*² | 64 | 6.8 | 32 | 32 | 50 |

*¹see footnote 1 - Table II
*²see footnote 2 - Table II
*³weight average molecular weight
*⁴10% 2-pyrrolidone assigned Control for calculation of pyrrolidone restriction.

Obviously many modification and variations of the invention, described hereinabove and below in the claims, can be made without departing from the essence and scope thereof.

What is claimed is:

1. A poly-2-pyrrolidone polymer composition, capable of being formed into filaments or other shaped articles, having a weight average molecular weight in the range of about from 35,000 to 100,000 and in which at least about 50% of the molecules of said poly-2-pyrrolidone are capped polymer molecules having the formula

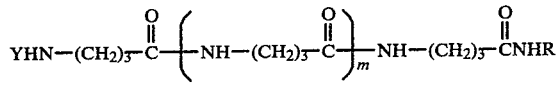

wherein R is a radical having 2 through 12 carbon atoms and having the formula $-R^1R^2Z$, wherein Z is hydroxy, $R^1$ and $R^2$ are independently selected from the group of lower alkylene or substituted lower alkylene having 1 through 3 substituents independently selected from the group of amino or hydroxy and wherein the total of the sum of the substituents in $R^1$ plus $R^2$ is from 0 through 3 and wherein each carbon atom in said radical has a maximum of one hydroxy or one amino substituent including the Z hydroxy substituent; Y is hydrogen or formyl; and m is a whole integer of at least about 200; and wherein said weight average molecular weight is determined by solution viscosity using a solution containing 0.50 to 1.0 grams of the dried extracted polymer in 10 ml of 88% aqueous formic acid, and applying a Gardner viscosity molecular weight type relationship developed from specific viscosities of 0.1 g of known weight average molecular weight poly-2-pyrrolidone polymers in 100 ml of m-cresol at 25° C.

2. The polymer composition of claim 1 wherein R has the formula —$R^3$—$CH_2$—OH wherein $R^3$ is as defined for $R^1$ in claim 1 but has 1 through 11 carbon atoms.

3. The polymer composition of claim 1 wherein R has the formula —$CH_2$—$(R^4)_{m'}$—$CH_2OH$ wherein $R^4$ is as defined for $R^1$ in claim 1 but has 1 through 10 carbon atoms, m' is 0 or 1.

4. The polymer composition of claim 1, wherein $R^1$ and $R^2$ are each lower alkyl.

5. The polymer composition of claim 4, wherein Y is hydrogen and R has 2 through 6 carbon atoms.

6. The polymer composition of claim 4, wherein Y is formyl and R has 2 through 6 carbon atoms.

7. The polymer composition of claim 1, wherein n is a whole integer of from 250 through 900.

8. The polymer composition of claim 1, wherein said polymer has a weight average molecular weight of about from 40,000 to 100,000.

9. The polymer composition of claim 1, wherein said polymer has a weight average molecular weight of about from 50,000 to 100,000.

10. The polymer composition of claim 1 wherein said capped molecules have the formula

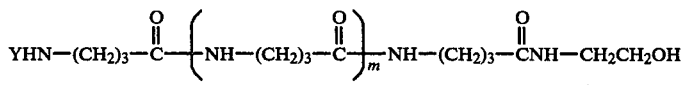

wherein m is as defined in claim 1.

11. The polymer composition of claim 10 wherein said m is about from 250 to 900.

12. The polymer composition of claim 1, wherein at least about 80% of said poly-2-pyrrolidone molecules are said capped polymers.

13. A process for preparing the polymer composition of claim 1 which comprises contacting poly-2-pyrrolidone polymerizate having a weight average molecular weight of about from 35,000 to 100,000 with an amount of a capping agent, effective to improve the thermal stability of said poly-2-pyrrolidone without substantial molecular weight degradation under reactive conditions at temperatures in the range of about from 25° to 80° C. for 0.5 to 50 hours thereby yielding the corresponding polymer composition of claim 1, and wherein said capping agent is selected from the group of alkanolamines having the formula $NH_2R^1R^2OH$ wherein $R^1$ and $R^2$ are as defined in claim 1 and said alkanolamine has a sum total maximum of 5 amino and hydroxy groups, and wherein weight average molecular weight is as defined in claim 1.

14. The process of claim 13 wherein said capping agent has the formula $NH_2CH_2(R^4)_{m'}CH_2OH$ wherein $R^4$ is as defined in claim 13 for $R^1$ but has 1 through 10 carbon atoms and m' is 0 or 1.

15. The process of claim 14 wherein said alkanolamine has from 2 through 6 carbon atoms.

16. The process of claim 15, wherein said alkanolamine is ethanolamine.

17. The process of claim 13, wherein said poly-2-pyrrolidone polymerizate is contacted with said capping agent at temperatures in the range of about from 50° to 65° C. for about from 1 to 30 hours.

18. The process of claim 13 wherein said poly-2-pyrrolidone polymerizate is contacted with said capping agent in an inert organic solvent.

19. The process of claim 13, wherein said poly-2-pyrrolidone polymerizate was prepared by polymerizing 2-pyrrolidone in contact with a dimethylformamide initiator.

20. A process for preparing the poly-2-pyrrolidone polymer composition of claim 1 which comprises contacting poly-2-pyrrolidone having a weight average molecular weight in the range about from 200,000 to 1,000,000 with a capping agent selected from the group consisting of alkanolamines having the formula:

$$NH_2R^1R^2OH$$

wherein $R^1$ and $R^2$ are as defined in claim 1, and mixtures thereof, under reactive conditions at temperatures in the range of about from 50° C. to up to the lower of the reflux temperature of said capping agent or 250° C. for a sufficient period of time to degrade said poly-2-pyrrolidone to a weight average molecular weight in the range of 35,000 to 100,000 and cap said polymer thereby yielding the corresponding polymer composition of claim 1, and wherein said weight average molecular weight is as defined in claim 1.

21. The process of claim 20, wherein said alkanolamine has from 2 through 6 carbon atoms.

22. The process of claim 21, wherein said alkanolamine is ethanolamine.

23. The process of claim 20, wherein said poly-2-pyrrolidone is contacted with said capping agent at temperatures in the range of about from 100° to 180° C. for about from 0.5 to 30 hours.

24. The process of claim 20, wherein said poly-2-pyrrolidone is contacted with said capping agent in an inert organic solvent for said capping agent.

25. The process of claim 20, wherein said poly-2-pyrrolidone is prepared by polymerizing 2-pyrrolidone in contact with dimethylformamide initiator.

* * * * *